United States Patent
Chong et al.

(10) Patent No.: US 7,306,153 B2
(45) Date of Patent: Dec. 11, 2007

(54) SYSTEM AND METHOD FOR RAPID DEPLOYMENT OF A WIRELESS DEVICE

(75) Inventors: Kelvin Chong, San Jose, CA (US);
Paul Cowan, Hinckley, OH (US);
Allan Herrod, Mission Viejo, CA (US);
Janak Bhalodia, Mountain View, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 163 days.

(21) Appl. No.: 10/881,896

(22) Filed: Jun. 30, 2004

(65) Prior Publication Data

US 2006/0000910 A1    Jan. 5, 2006

(51) Int. Cl.
G06F 17/00 (2006.01)
G06F 19/00 (2006.01)
G06K 7/10 (2006.01)

(52) U.S. Cl. .......................... 235/462.15; 235/462.46; 235/472.02

(58) Field of Classification Search .......... 235/462.15, 235/462.09, 462.46, 472.02
See application file for complete search history.

(56) References Cited

U.S. PATENT DOCUMENTS

| | | | |
|---|---|---|---|
| 4,825,058 A * | 4/1989 | Poland | 235/462.01 |
| 5,488,223 A * | 1/1996 | Austin et al. | 235/375 |
| 5,777,315 A * | 7/1998 | Wilz et al. | 235/462.15 |
| 5,837,986 A * | 11/1998 | Barile et al. | 235/462.01 |
| 5,869,840 A * | 2/1999 | Helton | 235/472.01 |
| 5,962,839 A * | 10/1999 | Eskildsen | 235/472.01 |
| 5,979,762 A * | 11/1999 | Bianco | 235/462.01 |
| 6,321,989 B1 * | 11/2001 | Wilz et al. | 235/462.45 |
| 6,347,743 B2 * | 2/2002 | Wilz et al. | 235/472.01 |
| 6,459,863 B2 * | 10/2002 | Kawabe | 399/79 |
| 6,565,005 B1 * | 5/2003 | Wilz et al. | 235/462.25 |
| 6,802,659 B2 * | 10/2004 | Cremon et al. | 400/76 |
| 6,857,013 B2 * | 2/2005 | Ramberg et al. | 709/223 |
| 6,873,435 B1 * | 3/2005 | Tehranchi et al. | 358/1.9 |
| 2004/0206821 A1 * | 10/2004 | Longacre et al. | 235/462.07 |
| 2005/0086328 A1 * | 4/2005 | Landram et al. | 709/220 |

* cited by examiner

Primary Examiner—Uyen-Chau N Le
(74) Attorney, Agent, or Firm—Fay Kaplun & Marcin, LLP (57) ABSTRACT

Described is a system for configuring a wireless mobile device for operation on a wireless network including a receiving element to receive configuration information for the wireless device and a generation element to generate codes for an optically readable element, the optically readable element configured to be read by the wireless device, wherein the configuration information configures the wireless device for operation on a wireless network.

22 Claims, 8 Drawing Sheets

SYSTEM AND METHOD FOR RAPID DEPLOYMENT OF A WIRELESS DEVICE

BACKGROUND OF THE INVENTION

When a mobile unit ("MU") is added to a network, it must first be configured with parameters compatible with the network. The configuration process may include inputting network identifications and various passwords and/or security codes. An MU new to the network may also lack the latest updates and programs, requiring their download and installation before the MU is fully functional on the network.

Currently, a user of the MU manually enters all the necessary configuration information and downloads and installs all the required files. Whether this process is outsourced or executed internally, it is an additional task and cost that delays deployment of the MUs. Businesses that employ enterprise mobility solutions today typically have several thousand MUs connected to their network at one time. As the size of these networks grow, the costs and time associated with device roll-out increases exponentially. Moreover, a business with multiple facilities or networks may require that an MU be frequently transported between and reconfigured for different networks. Therefore, there is a need to expedite the cumbersome roll-out process so that new MUs are ready to connect to the network and perform their required operations with minimal time and effort.

SUMMARY OF THE INVENTION

A system for configuring a wireless mobile device for operation on a wireless network including a receiving element to receive configuration information for the wireless device and a generation element to generate codes for an optically readable element, the optically readable element configured to be read by the wireless device, wherein the configuration information configures the wireless device for operation on a wireless network.

In addition, a wireless mobile device, comprising an optical scanner to scan an optically readable element, the optically readable element including configuration information for the mobile device and an application to process the configuration information and configure the mobile device for operation on a wireless network.

Furthermore, a method for receiving configuration information for a wireless mobile device and generating codes for an optically readable element, the optically readable element configured to be read by the wireless device, wherein the configuration information configures the wireless device for operation on a wireless network.

A method for scanning an optically readable element with a wireless mobile device and configuring the wireless mobile device for operation on a wireless network using configuration information stored in the optically readable element.

DETAILED DESCRIPTION

The present invention may be further understood with reference to the following description and the appended drawings, wherein like elements are provided with the same reference numerals. Before a new MU can operate in a network environment, it must undergo an initial staging process that may include numerous steps. First, general network configuration information, such as an IP address and subnet mask, must be entered in order for the MU to communicate with other devices on the network. Because MUs are usually wireless devices, wireless network information, such as the Extended Service Set Identifier ("ESSID") and security encryption keys, may also be necessary.

Additionally, businesses routinely update their systems with new software, firmware, and programs. Incorrect versions may prevent performance of business functions or produce inaccurate results. By the time a new MU is pulled out of its box, the software components originally installed at the factory may already be outdated. MUs already connected to the network may need to periodically uninstall unused programs and download and install updates, a process of supplying services known as provisioning. Other data that may be delivered to the MU includes software licensing information or Dynamically Linked Libraries ("DLL"s) that link to existing applications for extensibility. A problem currently faced by many network administrators is ensuring uniformity across potentially thousands of mobile devices.

The exemplary embodiments of the present invention described herein include a system and method for rapidly deploying mobile units onto a wireless network. Throughout this description, the exemplary embodiment will be referred to as a rapid deployment ("RD") system and the various features and functions may be referred to as RD features and functions. The RD system alleviates the need for the time consuming and expensive manual configuration and provisioning of MUs being added to a network. After scanning a set of barcodes embedded with configuration commands, the MUs are quickly and automatically configured to communicate with and receive packets from other network devices. The barcodes themselves may also be encoded with updates, programs and other executables. MUs may be configured for the first time or may be reconfigured with new information for operation in the same or a different network.

Figure 1:
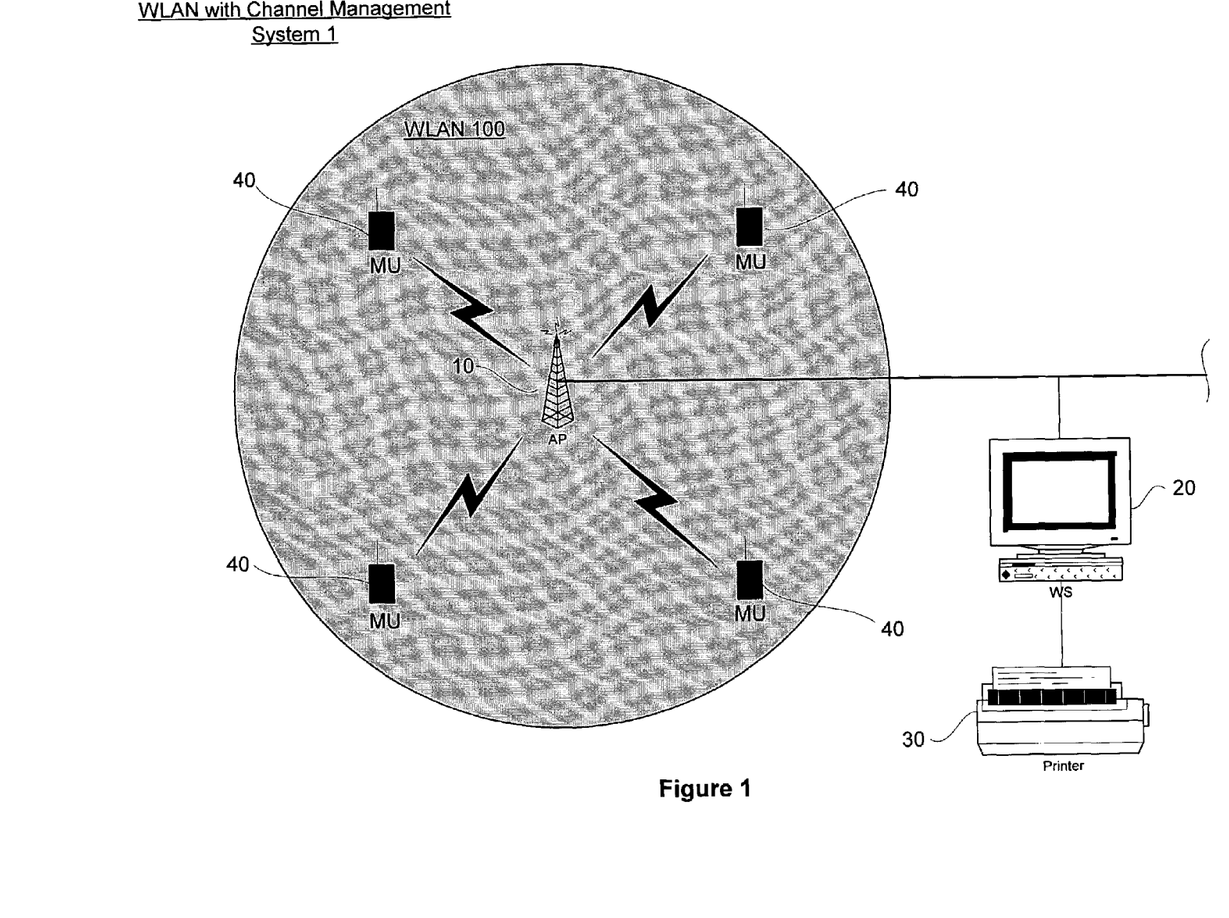
FIG. 1 shows an exemplary mobile network which may employ an exemplary embodiment of a Rapid Deployment ("RD") system according to the present invention.

FIG. 1 shows an exemplary mobile network 1 which may employ an exemplary embodiment of the RD system. The mobile network 1 may operate within a Wireless Local Area Network ("WLAN") in infrastructure mode. The mobile network 1 includes an access point ("AP") 10, a work station ("WS") 20, a printer 30, and a plurality of MUs 40. Those of skill in the art will understand that the exemplary embodiments of the present invention may be used with any wireless network and network 1 is only exemplary.

The WLAN may use a version of the IEEE 802.11 or a similar protocol. One benefit of using a version of the IEEE 802.11 standard is that existing infrastructures using that standard may be adapted to support the RD system with minimal modifications. With only a simple software upgrade, most MUs supporting that standard may operate according to the present invention. In other embodiments, a different wireless protocol such as Bluetooth may be used.

The AP 10 may be, for example, a router, switch or bridge that connects the wireless and wired networks. The WS 20 is also connected to the wired portion of the network and may be located remotely from the AP 10. The WS 20 may be, for example, a desktop or a laptop computer. The printer 30 may be connected directly to the WS 20 or may be a network printer.

The MUs 40 may be any type of computer or processor based portable device equipped with an optical scanning capability, e.g., barcode reader, camera, optical character recognition ("OCR"), etc., for reading barcodes or other optically readable characters or figures. Since the MUs 40 are portable, they are capable of connecting to a wireless network, and are sufficiently small to be easily carried. The MUs 40 may be specifically designed to be used only as barcode scanners, or may be handheld devices with different purposes, to which the scanner functionality has been added through a RD software module. In one embodiment, the MUs 40 are based on a multi-purpose personal digital assistant ("PDA") such as those running the Microsoft Pocket PC 2003 operating system, or similar.

The foregoing embodiment of a mobile network 1 employing the RD system is not to be construed so as to limit the present invention in any way. As will be apparent to those skilled in the art, different types of MUs may be used to communicate over the same data network, as long as they work under compatible protocols. Other configurations with different numbers of MUs, APs, or WSs may also be used to implement the method.

Figure 2:
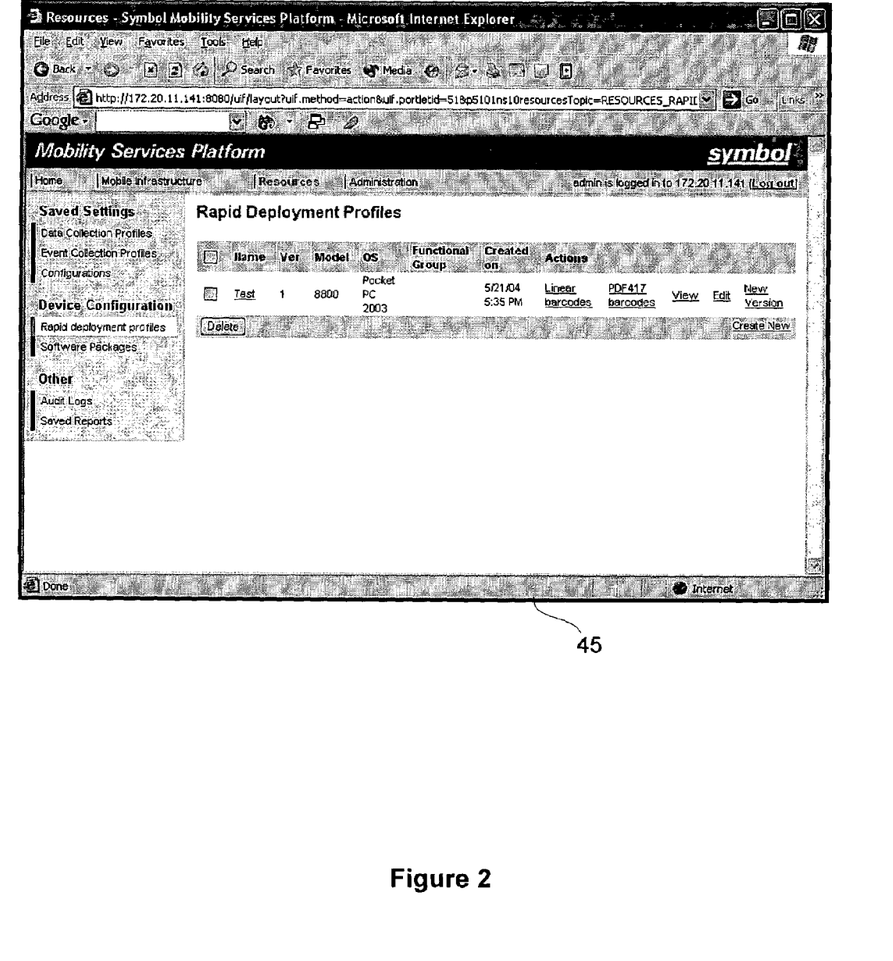
FIG. 2 shows an exemplary embodiment of a graphical user interface ("GUI") for the RD Tool used to display, edit and create RD profiles according to the present invention.

FIG. 2 shows an exemplary embodiment of a GUI 45 used for displaying and editing existing RD profiles and for creating new RD profiles on WS 20. In this embodiment, WS 20 is running Web-based server-side control software developed by Symbol Technologies, Inc. of Holtsville, N.Y., known as the Mobility Services Platform ("MSP"). The MSP is part of the larger Mobility Services Suite which is used for comprehensive wireless network management. Within the MSP is an RD Tool used to manipulate RD profiles. In alternative embodiments, other programs may be running on WS 20 to create, edit, and display RD profiles.

In FIG. 2, a profile named "Test" has been created and is displayed. Various characteristics of profile Test are shown, including the RD software version, the target MU 40 model number, the target MU 40 operating system, the date and time that the profile was created, and the barcode symbology types to be printed. Additional characteristics of a particular RD profile may also be displayed. The RD system will use the RD profile to generate barcodes for configuration of the MUs 40. The barcodes will be described in greater detail below. As shown on the GUI 45, a system administrator may edit the "test" profile or create a new profile by activating the appropriate buttons on the GUI 45.

Figure 3:
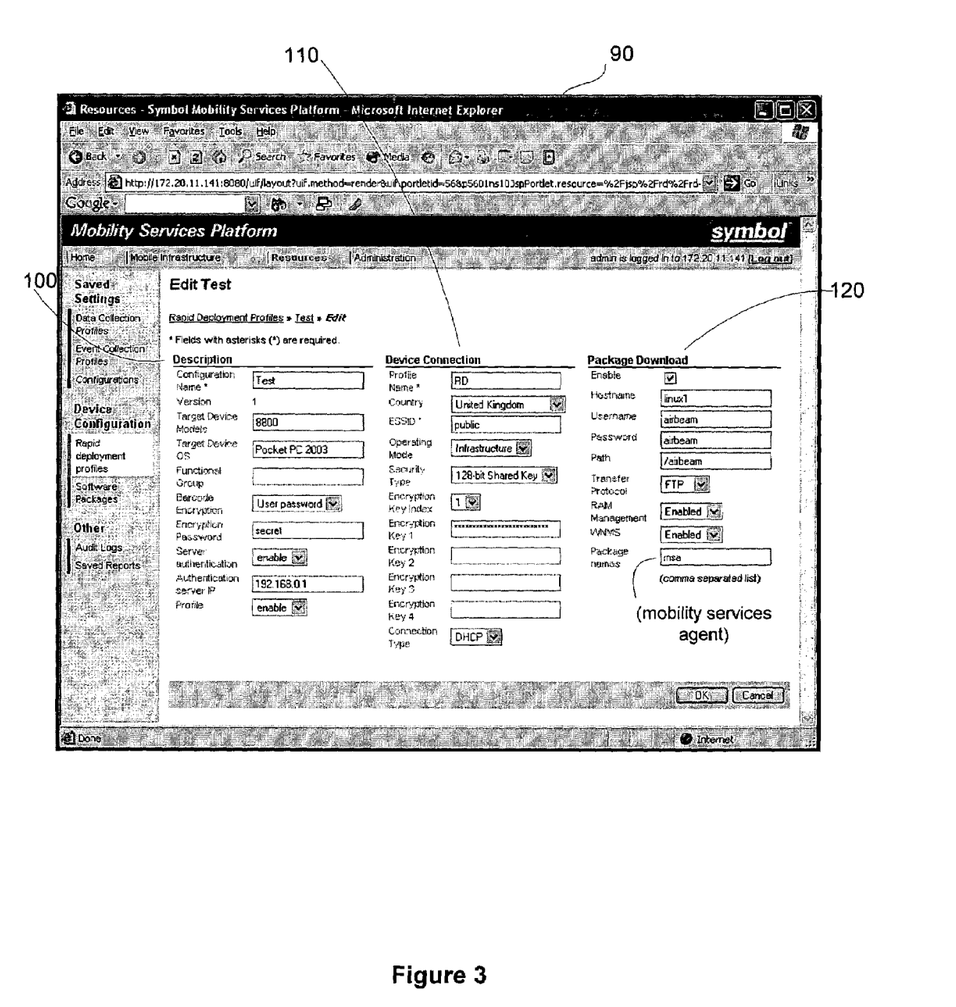
FIG. 3 shows an exemplary embodiment of a GUI for the RD Tool used to input configuration information to be encoded into barcodes according to the present invention.

To create or edit a RD profile, a system administrator may enter configuration information into the WS 20 through the RD Tool. FIG. 3 shows an exemplary embodiment of a GUI 90 of the RD Tool for entering or editing configuration information. The RD system will record and save the information that is entered on the GUI 90. In the example of FIG. 3, the system administrator has selected to edit the "test" profile.

The general types of information that may be entered into an RD profile are general device information, general network settings, wireless network settings, provisioning information and licensing information. As the various information that may be entered in GUI 90 is described below, it will become apparent to which general category the information is part. However, the RD system is not limited to either the specific information described or the general types of information described above. Based on specific implementations, other information may be entered into an RD profile.

Referring to the GUI 90, in the Description column 100, the system administrator provides the name of the profile ("test"), the target device model ("8800") and the target device operating system ("Pocket PC 2003"). The RD profile may be set to encode configuration information for a set of MUs 40 or a particular MU 40 identified, for example, by a serial number. The set may be identified by a functional group which may be defined by the system administrator, e.g., all MUs 40 which belong to a user defined group should have the same configuration information.

The RD profile may generate either an encrypted or an un-encrypted barcode. Encryption may include, for example, system or user-supplied password encryption. For system encryption, the MU 40 may include an internal password which allows the MU to decrypt the barcode without user interaction. The user password encryption may require a user of the MU 40 to enter a password into the MU 40 before decryption of the barcode is performed. The system administrator may set the encryption type and any passwords using the GUI 90.

The generated barcodes may also require server authentication to assure that the barcodes are current. For example, the generated barcodes may include expiration dates or other authentication information. When an MU 40 scans the barcode, before using the information contained in the barcode for configuring the MU 40, the MU 40 may transmit the information to a network server to verify that the correct barcodes are being used. The system administrator may enable the server authentication and identify the network server which should be used for the authentication through the GUI 90.

The RD Tool allows the general and wireless network settings to be input under the Device Connection column 110. In the example of FIG. 3, the name of the profile ("RD"), the country of operation ("United Kingdom"), the ESSID of the wireless network ("public"), the operating mode ("infrastructure") and the security type ("128-bit Shared Key") have been entered by a system administrator. In addition, encryption keys and the connection type ("DHCP") may also be assigned. In this example, a Dynamic Host Configuration Protocol ("DHCP") connection dynamically allocates IP addresses for the MUs 40. If only one MU is targeted, the system administrator can instead designate a static IP address and subnet mask. Alternative embodiments may use other protocol suites such as AppleTalk or XNS. Because wireless networks are often password protected to restrict access to the network, the system administrator may also need to encode one or more encryption keys. Therefore, in the example of FIG. 3, one such encryption key is has been input.

The RD Tool may be configured to include various data entry methods such as character entry fields, drop down menus, scroll menus, etc. The GUI 90 shows both character entry fields and drop down menus. The menus may include all the selections available to the system administrator for a particular configuration parameter.

If provisioning is desired as part of the MU 40 configuration, commands may be encoded into the barcodes to indicate how the MUs 40 should connect to a provisioning server. Provisioning may be used to download and run packages on the MUs 40 that contain executable files, applications, software and firmware updates, DDLs, or any other type of files. Barcodes with large storage capacities can themselves be embedded with commands to perform these services.

For example, as shown in the package download column 120 of the GUI 90, the RD profile is configured to deliver a package entitled "msa" to MUs 40. The system administrator enables the package download and provides the name of the provisioning server ("linuxl"), the username ("airbeam"), the password ("airbeam") needed to access that server's resources and the path of the package to be downloaded ("/airbeam"). The system administrator further includes the type of transfer protocol to be used ("FTP") and enables the random access memory ("RAM") management and the wireless network management system ("WNMS").

The system administrator may then save the profile and print out the barcodes on the printer 30. The barcodes will include all the information which the system administrator saved for the particular profile. The profile described with reference to FIG. 3 is only exemplary and the system administrator may create any number of profiles based on the various configuration parameters that are used for the MUs 40.

Figure 4:
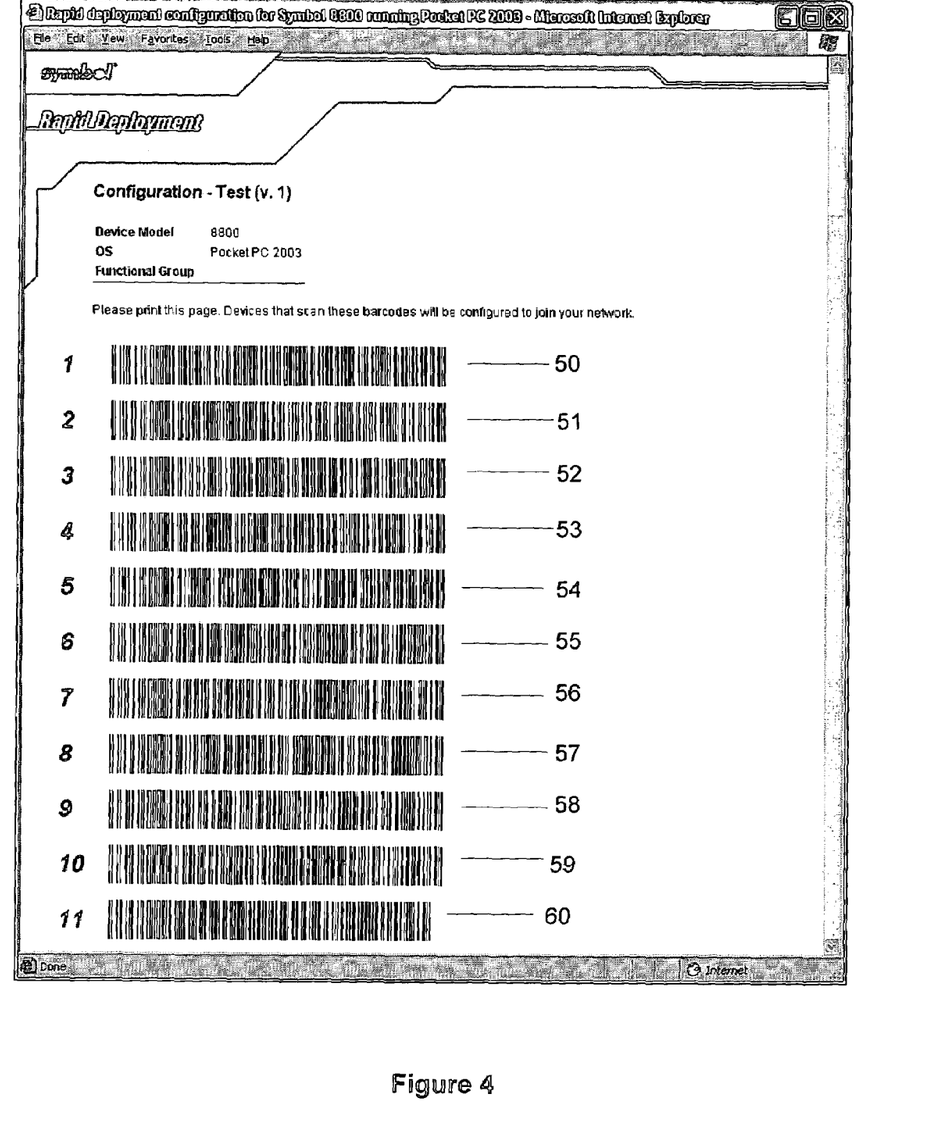
FIG. 4 shows an exemplary embodiment of a set of linear barcodes according to the present invention.

FIG. 4 shows an exemplary embodiment of a set of eleven linear barcodes 50-60 generated from an RD profile. The amount of information that can be stored in a linear barcode 50 is limited by practical considerations such as its printed length and scanner size. Depending on the barcode symbology used, such as Code 39 or Interleaved 2 of 5, the upper limit is normally between 20 to 50 characters. Consequently, encoded RD configuration commands may require a plurality of linear barcodes.

In addition to the configuration commands, each linear barcode 50-60 may be encoded with supplemental information, for example, in a header. The header may include information such as a unique identification for the sheet on which the barcodes are printed, the version number of the barcodes, the barcode encryption and an order of the barcodes. FIG. 4 shows a display having the barcodes 50-60. However, the barcodes may be printed on a sheet of paper for use with the MUs 40. In order to control the number of sheets for distribution, each sheet may have a unique identification. This unique identification may be used for authentication purposes. It may also be to ensure that when a user starts scanning one set of barcodes and then attempts to scan a second set of barcodes, the second set of barcodes will not scan in order to prevent mismatched or spurious information from being input to the network. The version may indicate the particular version of the barcode encoded RD profile. In this example, this is version 1 of the RD profile "test." The barcode encryption indicates the encryption type of the barcode.

The barcode order indicates the order in which the barcodes 50-60 were encrypted. For example, assuming that the barcodes 50-60 were encrypted in sequential order, the barcode 50 may include information which identifies the barcode 50 as 1 of 11 barcodes, the barcode 51 as 2 of 11 barcodes, etc. This order may allow a user when scanning the bar codes to be assured that each barcode was scanned. For example, the MU 40 scanning the barcode may indicate to the user that a barcode is missing, e.g., barcode 3 of 11 was not scanned. Other information may also be included in the header of each of the barcodes.

Figure 5:
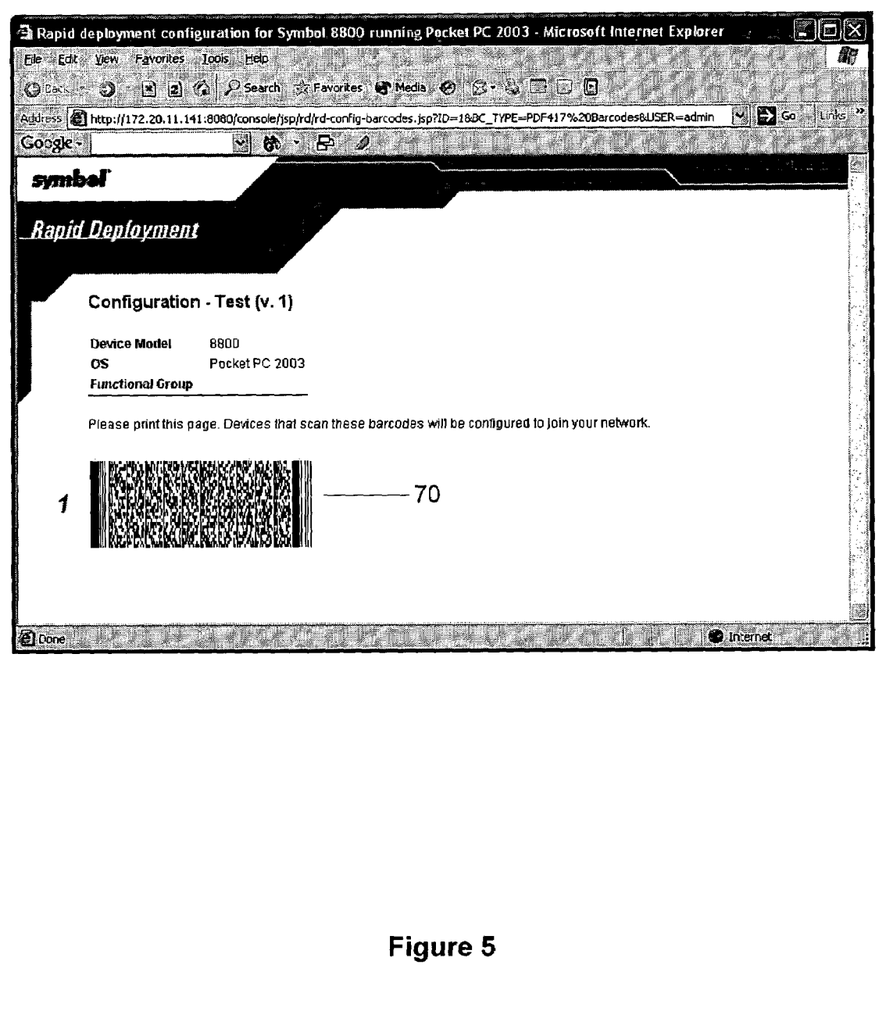
FIG. 5 shows an exemplary embodiment of a two-dimensional barcode according to the present invention.

FIG. 5 shows an exemplary embodiment of a two-dimensional barcode. Barcode 70 is of symbology type PDF417. Alternative embodiments may utilize Code 49, Data Matrix, Aztec Code, or any other two-dimensional barcode symbology. Two-dimensional barcodes have a considerably higher storage capacity than their linear counterparts. A PDF417 barcode can store approximately two thousand characters. As a result, all the configuration information contained in the exemplary RD profile "test" described above may be encoded into a single two-dimensional, e.g., barcode 70.

However, in the same manner as described above for the linear barcodes, there may be multiple two-dimensional barcodes used to encode the RD profile. A set of two-dimensional barcodes should contain header information relating to sequence as described above and may also include other header information. This may be the case when the barcode is used to encode lengthy messages, programs, executables, etc.

Furthermore, while the examples of linear and two-dimensional barcodes have been described above, those of skill in the art will understand that other methods of encoding the configuration parameters may also be used. The RD system according to the present invention may be used with any encoding method wherein the MU has the ability to read the encoded configuration parameters and configure itself for operation on the wireless network.

Figure 6:
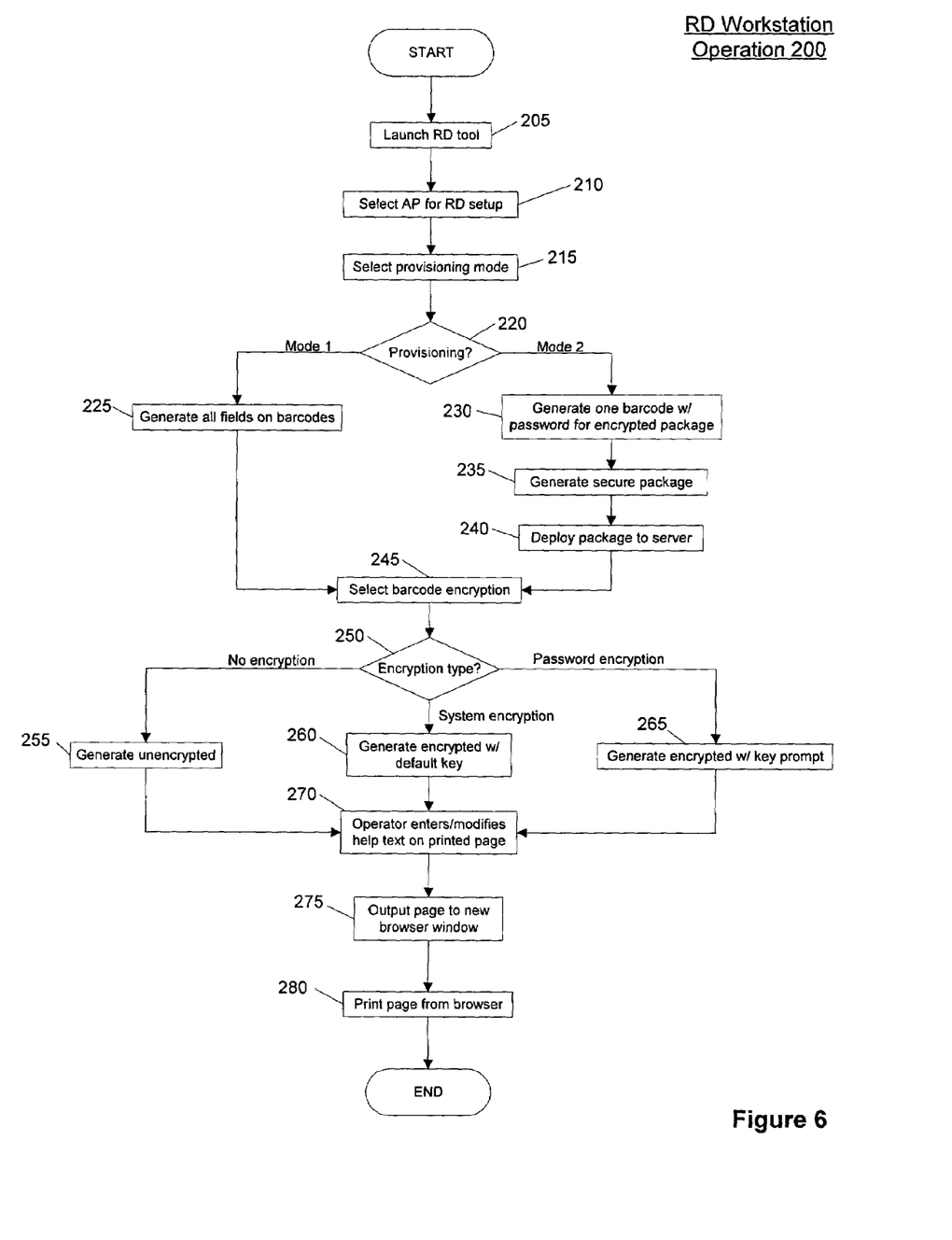
FIG. 6 shows an exemplary process for operation of the Work Station of the RD system according to the present invention.

FIG. 6 shows an exemplary process 200 for the WS 20 operation of the RD system. This process 200 may either be outsourced to a third party or executed internally by the owner of the wireless network. For example, the third party may be the vendor of the device such that the barcodes may be included in the box with the device. Throughout this description, it will be considered that the system administrator will be operating the WS 20. Initially, the RD Tool is launched on the WS 20 in step 205. In step 210, the system administrator selects the AP for which the MU should be configured. As described above, this configuration may include information such as the ESSID, the operating mode, the security type of the AP, encryption keys for the AP, the assignment of IP addresses, etc. This information is stored in the RD profile.

In step 215, the system administrator selects the provisioning mode for the RD system. In step 220, the RD Tool determines the selected provisioning mode. In mode 1, all the provisioning information is stored in the generated barcode. Thus, in step 225, the system administrator enters all the provisioning information into the RD profile and this information will be encoded into the barcode when it is generated. All the provisioning information is self-contained in the barcodes.

However, if the system administrator selects mode 2 provisioning, the barcode will contain information as to where the MU 40 may obtain the desired provisioning packages. A special barcode is generated in step 230 containing password information for accessing provisioning packages from a network server. The barcode may also contain additional information such as the name of the host server, the path for the package, the transfer protocol, etc., as described above with reference to the package download column 120 of the GUI 90 in FIG. 3.

In a next step 235 of provisioning mode 2, the provisioning package is created and secured by a password. As described above, a provisioning package may include a series of applications and services that is to be deployed on the MU 40. This package of applications and services may be stored on a network server. The RD tool may be used to create this package on the network server. In step 240, the provisioning package is deployed to the provisioning network server.

Those of skill in the art will understand that a system administrator may not need to generate the provisioning package each time a profile is created. For example, a new RD profile may use a previously created provisioning package. Thus, the information for the previously created provisioning package may be stored in the new RD profile, making steps 235 and 240 optional.

In step 245, the system administrator selects the type of barcode encryption to be used. The RD tool determines the selection in step 250 and the RD Tool performs one of three encryption tasks. The first task as shown in step 255 is to generate barcodes without any encryption. The second task as shown in step 260 is to generate barcodes with system encryption, i.e., encrypted with an individual MU 40 internal password. The third task as shown in step 265 is to generate barcodes which are encrypted with a password, i.e., the user of the MU 40 must enter a password before the barcodes are decrypted.

As a final step before the barcode sheet is ready to be output, the system administrator may create or modify instructions to be printed along with the barcodes in step 270. An output page is then displayed with the generated barcode sheet(s) in a browser on the WS 20 in step 275. Finally, in step 280, the barcode sheet(s) are printed from the printer 30. At the completion of the process 200, the system administrator has generated barcode sheet(s) for use in the configuration of MUs 40.

Figure 7:
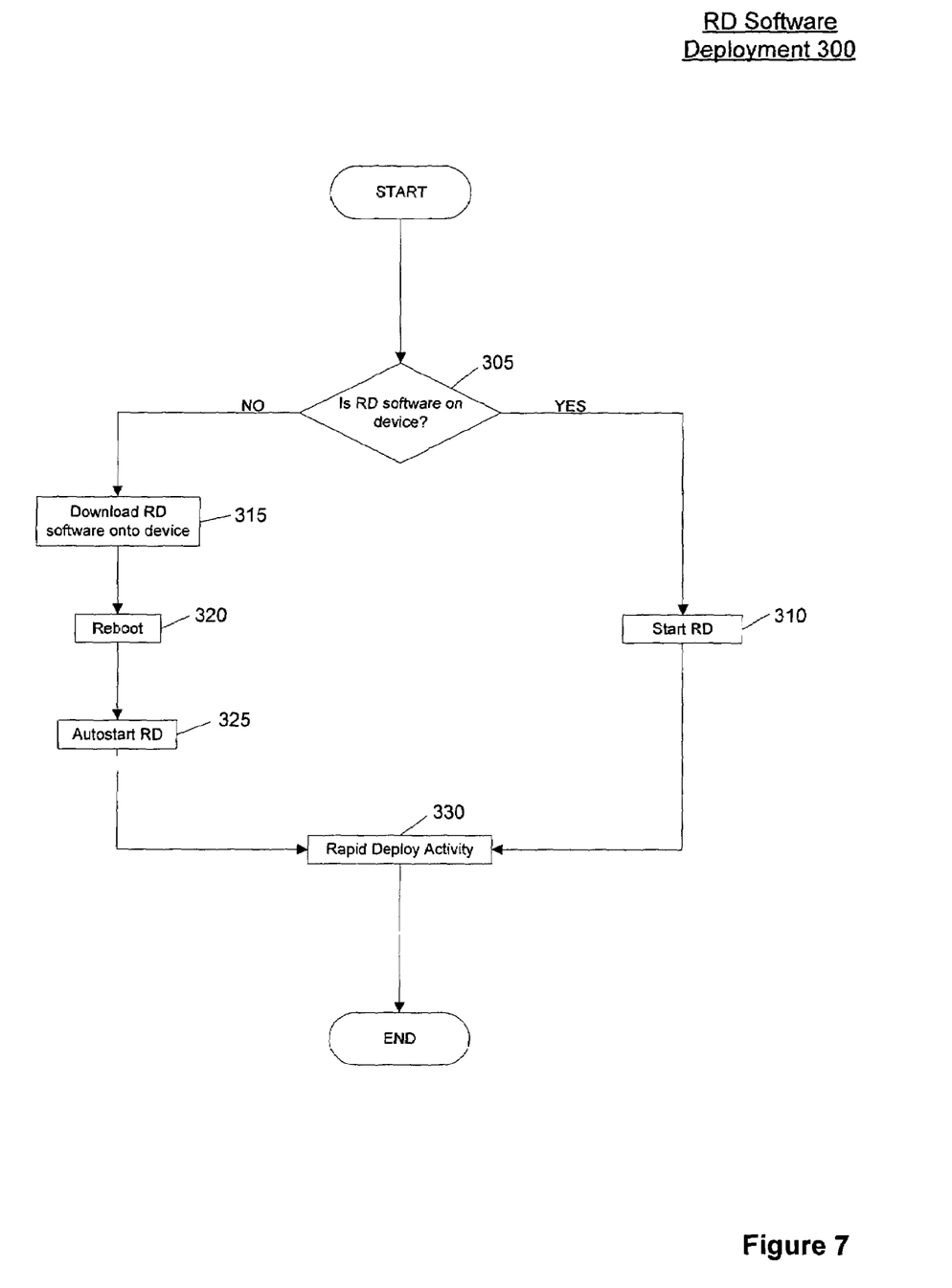
FIG. 7 shows an exemplary process for the deployment of the RD software on the MU according to the present invention.
Figure 8:
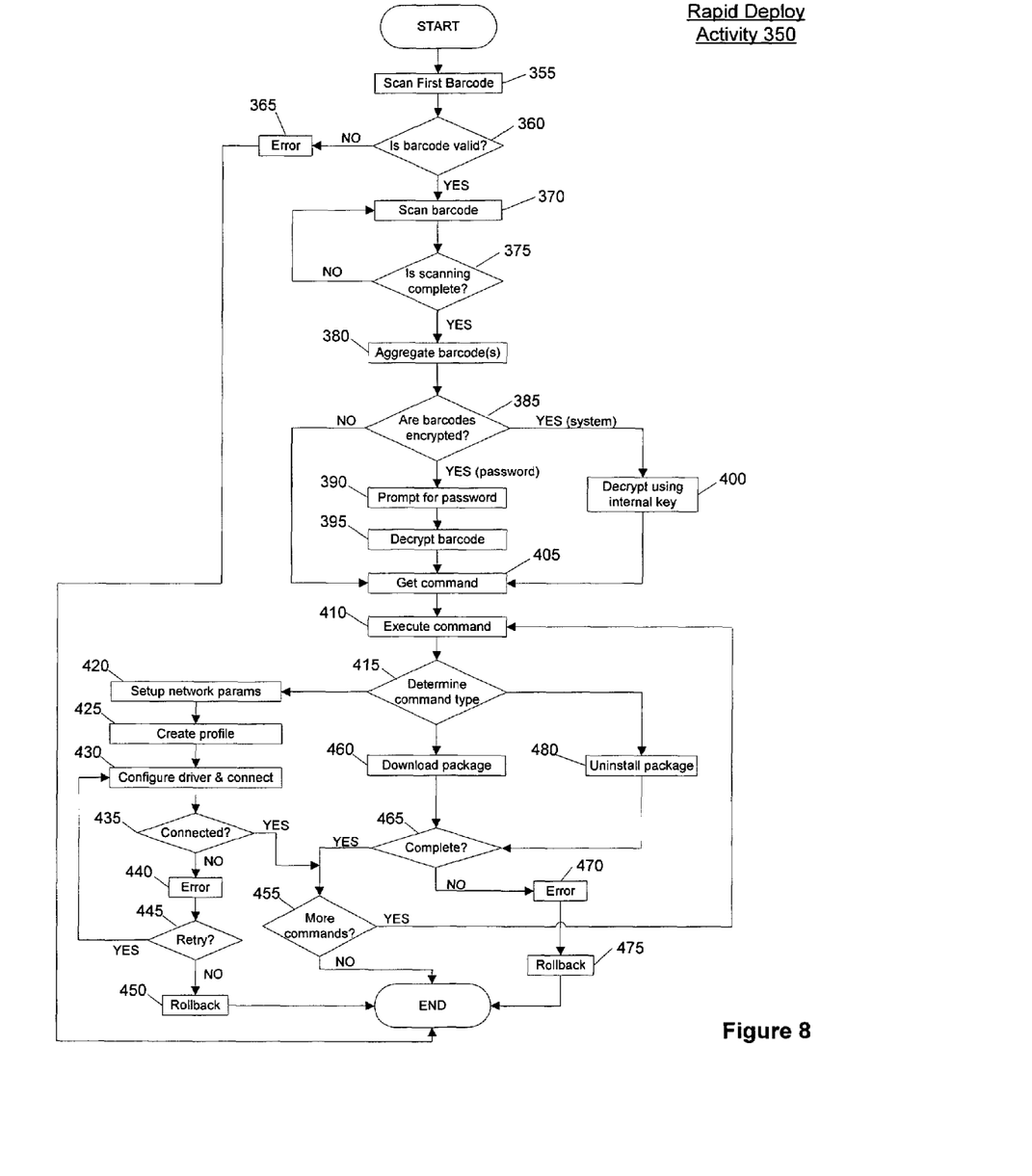
FIG. 8 shows an exemplary process for the rapid deployment of an MU on the network according to the present invention.

FIGS. 7 and 8 show exemplary processes relating to the MU 40-side RD system roll-out. Whether being taken out of the box for the first time or being reconfigured for a different network, each MU 40 must initially be running the necessary RD system software. FIG. 7 shows an exemplary process 300 for the deployment of the RD software on the MU 40. In step 305, the user of a MU 40 that is to be added to a network determines whether the device already contains the RD software. If the RD software is already loaded onto the MU 40, the user simply needs to start the RD program in step 310 and then begin the desired activity in step 330.

However, if the RD software is not already loaded, the user will download the RD software to the MU 40 in step 315. A network which uses the exemplary RD system, may have the RD software distributed at various locations throughout the network to allow for easy access by users of the MUs. After the RD software is downloaded to the MU 40, it is rebooted in step 320, and the RD software may automatically start upon reboot in step 325. The user may then commence the rapid deploy activity in step 330.

FIG. 8 shows an exemplary process 350 for the rapid deployment of an MU on the network. The process 350 is an expansion of the RD activity step 330 in FIG. 7. A user of an MU 40 obtains a barcode sheet from the system administrator. The MU 40 may be a new MU or an MU that has already been connected to the network 1, but needs to be re-configured for any one of a variety of reasons.

In step 355, a first barcode on the barcode sheet is scanned. In step 360, it is determined whether the scanned barcode is valid. Invalid barcodes may be the result of the user receiving a barcode sheet that does not match the MU 40 that the user is attempting to configure. For example, the exemplary barcodes 50-60 shown in FIG. 4 are for a Model 8800 device. If the MU 40 that scanned the barcodes 50-60 was not a Model 8800 device, the device would not accept the barcodes. In another example, the barcodes may have an expiration date and the date may have passed resulting in invalid barcodes. The RD software may check the expiration date or it may contact a network server to determine whether the sheet(s) remain valid. In a further example of invalid barcodes, the barcodes that are scanned may not even be RD barcodes. Those of skill in the art will understand that there may be many other reasons for invalid barcodes. If the barcodes are invalid, the process continues to step 365 where an error is generated on the MU 40 for the user and the process ends.

If the barcodes are valid, the MU 40 continues to scan the remaining barcodes in step 370. The process continues to loop through steps 370 and 375 until all the barcodes have been scanned. As described above, the barcodes may include header information indicating the number of barcodes that make up the complete set. Thus, the user may receives prompts and continue scanning until the set is complete. Once all the barcodes are scanned, they are aggregated sequentially in step 380.

In step 385, the RD software on the MU 40 determines the encryption type of the barcodes. If the barcodes are not encrypted, the process continues to step 405 which will be described below. If the barcodes are encrypted, they may be encrypted with a system password or a user password. If the encryption includes a user password, a prompt for the password is displayed on the MU 40 (step 390). The user enters the correct password and the barcodes are decrypted in step 395. If the password is incorrect, the user may be prompted for the password again. There may be a limit to the number of attempts at entering the correct password. Upon exceeding this limit, the user may be locked out of the mobile network 1 and/or the MU 40 until the system administrator intervenes. The steps related to incorrect passwords are not shown in the exemplary process 350.

The third type of encryption is system encryption. In this encryption, the MU 40 will include an internal password which may be used to decrypt the barcodes as shown in step 400. If the MU 40 does not have the correct internal password, the barcodes will not be decrypted and intervention from the system administrator may be required.

In step 405, the commands which are resident in the scanned barcodes are extracted. In step 410, the MU 40 begins executing the commands contained in the barcodes. In this example, there are three general types of commands and each of these will be described. The first type of command is a network setup command. If the command is to add MU 40 to the network for the first time, the first command would be for setting up network parameters, represented by step 420. As described above, the RD profile will include the network configuration parameters for the MU 40. When the command is executed these configuration parameters will be set and stored as the local profile for the MU 40 in step 425.

In step 430, the RD software configures the various wireless network drivers on the MU 40 and attempts to connect to the network 1 to determine if the configuration was successful. In step 435, the RD software determines if the MU 40 connected to the wireless network 1. If the MU 40 has not connected to the network 1 after a time out period, an error message is generated on the MU in step 440 and the user is prompted to retry the connection in step 445. If the user selects a retry, the process loops back to step 430 where the MU 40 again attempts to connect to the network 1.

If the user aborts the connection in step 445, the process continues to step 450 where the MU is rolled back to its previous settings. Roll back refers to the MU 40 being reset to the settings it contained prior to the execution of the RD command. While not shown in the process 350, the MU 40 may store any configuration settings which are changed by the RD command in a buffer until the entire RD transaction has has been successfully completed. The success may be determined by user prompt or by a successful operation by the MU 40. For example, if the MU 40 had successfully connected to the network 1 in the above example, and that was the last command to be executed in the RD transaction, the buffer storing the previous settings may have been cleared upon the successful connection or after the user received a prompt indicating the successful connection. However, when the command is not successful, the MU 40 may be rolled back to its previous settings as if the RD command had not been executed.

Other situations in which the MU 40 may need to roll back to a previous state include where an RD command is interrupted or not completed because of errors during execution. For example, the user may accidentally power off the MU 40 while the RD commands are still being executed or the MU 40 may crash due to software and/or hardware conflicts. The system administrator may also have entered incorrect configuration or provisioning information when creating the RD profile, causing attempts to connect to time out. If roll back is indeed necessary, the MU 40 may reboot, retrieve and restore the prior settings. Once the system is rolled back to the saved state, the new configuration commands may then be re-run until execution is complete.

The RD system may include commands relating to the start of a transaction and the end of a transaction to mark the beginning and end of the RD transaction. The start transaction marker may indicate that the system should save all the current settings into a buffer because an RD transaction is about to be commenced. The end transaction marker may indicate that the current transaction has been completed successfully and therefore the buffers may be cleared.

Referring back to the process 350, if the MU 40 successfully connects to the network 1, the process 350 continues to step 455 to determine whether there are additional RD commands to be executed. If there are the process continues back to step 410 to execute the next command. Otherwise, the process 350 is complete.

The second general type of command is related to the downloading of provisioning packages. In step 460 the MU 40 downloads the provisioning package. As described above, the complete provisioning commands may be included in the barcodes or the server information for obtaining the provisioning packages may be included in the barcodes. In either case, the MU 40 will uses the encoded information to download the provisioning package. In step 465, the MU 40 determines if the download was successful. If successful, the process 350 continues to step 455 to determine whether there are additional RD commands to be executed and back to step 410 to execute the next command or the process is complete. If the download is unsuccessful, the process continues to step 470 where the user receives an error message and the MU 40 is rolled back to the original settings in step 475.

The third general type of command is related to the un-installing of provisioning packages which are no longer needed on the MU 40. In step 480 the MU 40 un-installs the provisioning package as indicated in the RD command. The process then continues to step 465 and continues in the manner described above.

At the successful completion of the process 350, the MU 40 has been configured for connection to the wireless network and has been provisioned with the software applications and services needed for its operation. This configuration was accomplished by downloading or including the RD software on the MU and scanning the bar codes. Thus, the RD system allows for the rapid deployment of an MU with little or no interaction by the user of the MU. Using the RD system, a system administrator may be able to create a single profile for a certain type of device or grouping of devices and deploy hundreds of these devices by merely having the device users scan barcodes which include the profile. This alleviates the need for the system administrator or the user from having to individually set up each of the devices.

The above described examples included network settings and provisioning information. However, other types of information may also be included in the generated barcodes. For example, the barcodes may include licensing information for the device and/or software included on the device. This licensing information may include manners of registering the device when it is connected to the network, accepting use licenses for software, etc. Thus, the barcode configuration is not merely limited to network settings and provisioning information, but may be extended to any parameters that need to be set based on the devices use on the wireless network to which it is connected.

In addition, as described above, the information that is encoded in the barcodes does not need to be limited to parameters and parameter values. It may be possible to encode executable files in the barcodes. These executables may be software programs or portions of software programs such as procedures or functions. Other types of information also include parameters which trigger the execution of code at remote locations, e.g., the download of software from a network server.

The present invention has been described with the reference to the above exemplary embodiments. One skilled in the art would understand that the present invention may also be successfully implemented if modified. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A system, comprising:
   a receiving element to receive configuration information for a wireless device; and
   a generation element to generate encrypted codes for an optically readable element, the optically readable element configured to be read by the wireless device, wherein the configuration information configures the wireless device for operation on a wireless network, wherein the optically readable element includes data indicating an amount of optically readable elements in a first set to which the optically readable element belongs, and wherein the wireless device is prevented by the data indicating the amount from reading a second set of optically readable elements until the entire first set is read.

2. The system of claim 1, wherein the optically readable element is one of a linear bar code and a two-dimensional bar code.

3. The system according to claim 1, wherein the receiving element includes a graphical user input for a user to enter the configuration information.

4. The system of claim 1, wherein the configuration information includes one of device information, network settings, wireless settings, provisioning information and licensing information.

5. The system of claim 1, wherein the optically readable element includes executable codes.

6. The system of claim 1, further including an output element to output the encrypted codes to a printer which prints the optically readable element.

7. The system according to claim 1, wherein the encryption is one of a system password encryption and a user-supplied password encryption.

8. The system of claim 1, wherein the optically readable element includes a plurality of optically readable elements and each of the plurality of optically readable elements includes information which uniquely identifies each of the plurality of optically readable elements.

9. A wireless mobile device, comprising:
an optical scanner to scan an optically readable element that includes encrypted codes, the optically readable element including configuration information for the mobile device; and,
an application to process the configuration information and configure the mobile device for operation on a wireless network, wherein the optically readable element includes data indicating an amount of optically readable elements in a first set to which the optically readable element belongs, and wherein the mobile device is prevented the data indicating the amount from reading a second set of optically readable elements until the entire first set is read.

10. The wireless mobile device of claim 9, wherein the optically readable element that includes encrypted codes is one of a linear bar code and a two-dimensional bar code.

11. The wireless mobile device of claim 9, wherein the application transmits the configuration information to a network server to verify the configuration information is correct.

12. The wireless mobile device of claim 9, wherein the configuration of the wireless mobile device includes connecting to a provisioning server and downloading further applications to the wireless mobile device.

13. The wireless mobile device of claim 9, wherein the optical scanner includes one of a barcode reader, a camera and an optical character recognition element.

14. A method, comprising the steps of:
receiving configuration information for a wireless mobile device;
generating encrypted codes for an optically readable element, the optically readable element configured to be read by the wireless device, wherein the configuration information configures the wireless device for operation on a wireless network, wherein the optically readable element includes data indicating an amount of optically readable elements in a first set to which the optically readable element belongs, and wherein the wireless device is prevented by the data indicating the amount, from reading a second set of optically readable elements until the entire first set is read.

15. The method of claim 14, wherein the optically readable element includes provisioning information.

16. The method of claim 15, wherein the provisioning information includes an identification of a network device from which the wireless device receives a provisioning package.

17. The method of claim 14, further comprising the step of:
displaying the optically readable element to a user.

18. A method, comprising the steps of:
scanning an optically readable element that includes encrypted codes with a wireless mobile device; and
configuring the wireless mobile device for operation on a wireless network using configuration information stored in the optically wireless network, wherein the optically readable element includes data indicating an amount of optically readable elements in a first set to which the optically readable element belongs, and wherein the wireless mobile device is prevented by the data indicating the amount from reading a second set of optically readable elements until the entire first set is read.

19. The method of claim 18, further comprising the step of:
verifying the optically readable element that includes encrypted codes is valid before configuring the wireless mobile device.

20. The method of claim 18, wherein the optically readable element that includes encrypted codes is a plurality of optically readable elements, the method further comprising the step of:
aggregating the configuration information from the plurality of optically readable elements.

21. The method of claim 18, further comprising the step of:
rolling back the wireless mobile device to previous configuration settings when the configuration using the configuration information in the optically readable element is unsuccessful.

22. The method of claim 18, further comprising the step of:
decrypting the encrypted codes prior to configuring the wireless mobile device for operation on a wireless network.

* * * * *

UNITED STATES PATENT AND TRADEMARK OFFICE
CERTIFICATE OF CORRECTION

PATENT NO. : 7,306,153 B2  Page 1 of 1
APPLICATION NO. : 10/881896
DATED : December 11, 2007
INVENTOR(S) : Chong et al.

It is certified that error appears in the above-identified patent and that said Letters Patent is hereby corrected as shown below:

IN THE SPECIFICATION

In Column 5, Line 16, delete "("linuxl")," and insert -- ("linux1"), --, therefor.

IN THE CLAIMS

In Column 11, Line 29, in Claim 9, after "prevented" insert -- by --.

In Column 12, Line 21, in Claim 18, delete "wireless network," and insert -- readable element, --, therefor.

Signed and Sealed this

Thirty-first Day of August, 2010

David J. Kappos
*Director of the United States Patent and Trademark Office*